March 4, 1930.  C. A. DE GIERS  1,749,419
TANK INDICATOR
Filed Feb. 25, 1921  3 Sheets-Sheet 1
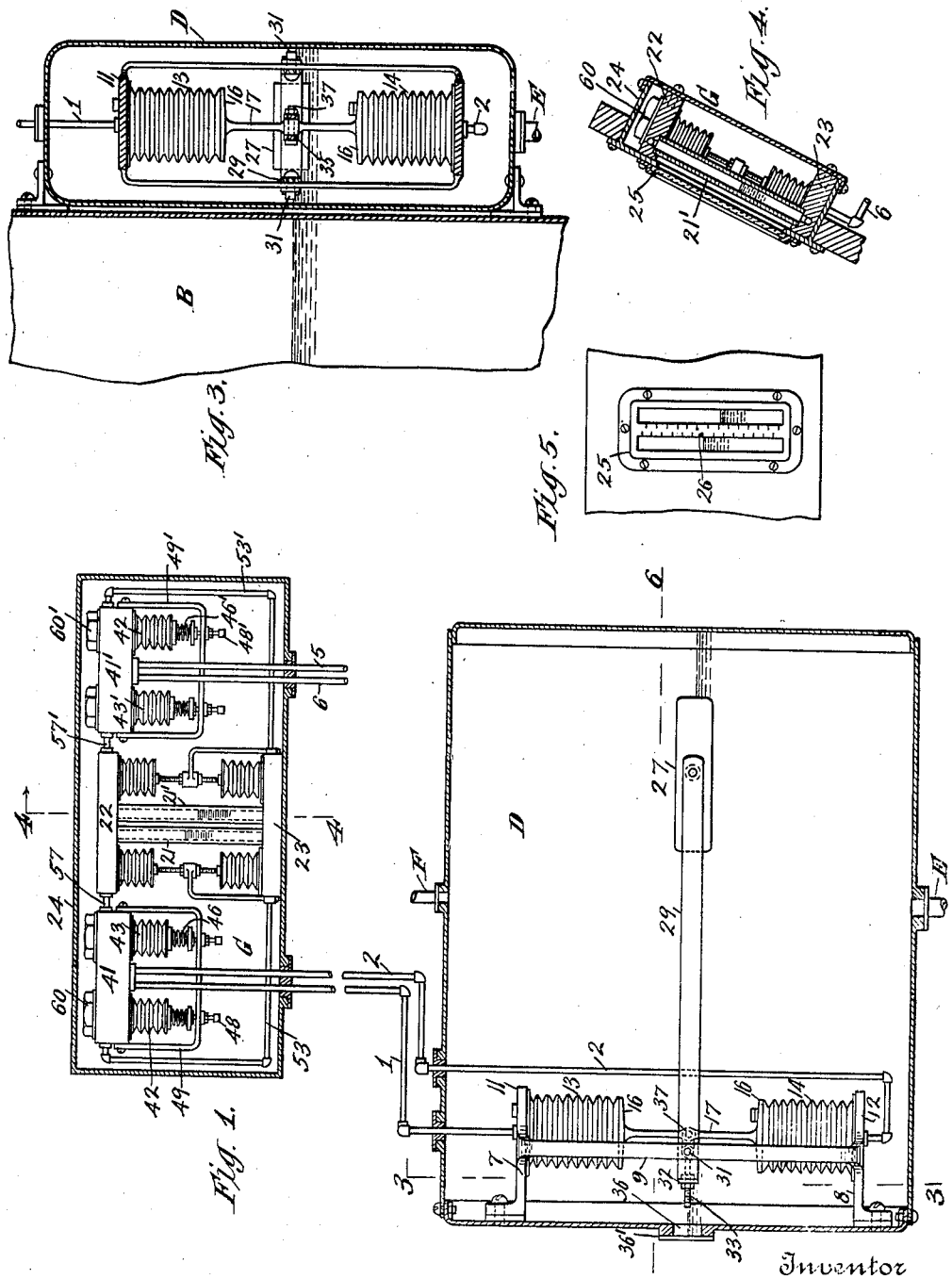

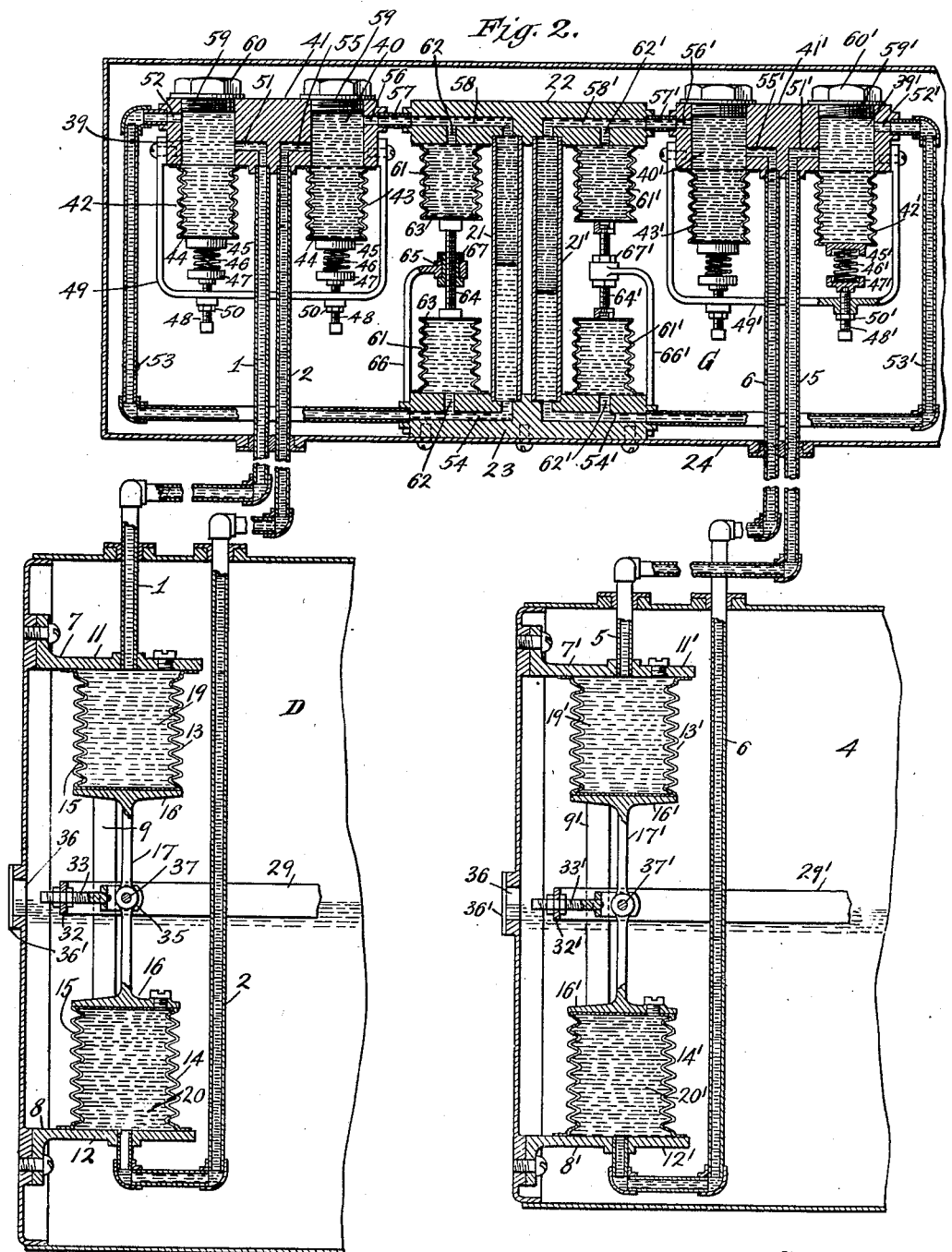

March 4, 1930.                C. A. DE GIERS                1,749,419
                              TANK INDICATOR
                           Filed Feb. 25, 1921        3 Sheets-Sheet 3
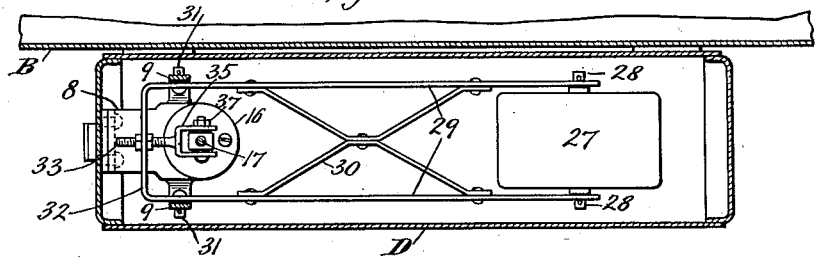
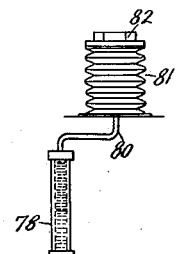
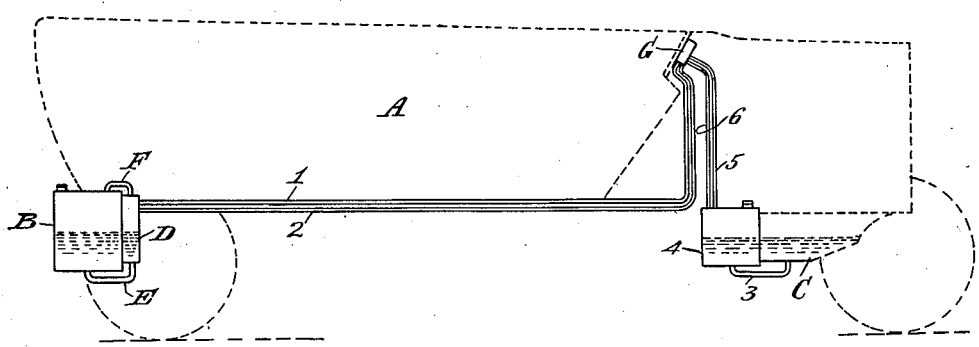

Patented Mar. 4, 1930

1,749,419

UNITED STATES PATENT OFFICE

CLARENCE A. DE GIERS, OF NEW YORK, N. Y., ASSIGNOR, BY MESNE ASSIGNMENTS, TO THE LIQUIDOMETER CORPORATION, OF WILMINGTON, DELAWARE, A CORPORATION OF DELAWARE

TANK INDICATOR

Application filed February 25, 1921. Serial No. 447,640.

This invention relates to certain improvements in indicators of that class in which the quantity of liquid in a tank or similar receptacle may be indicated at any desired point, the mechanism of the indicator being operated by the height of the fluid in the receptacle.

It is the especial object of the present invention to produce a mechanism of simple construction in which different kinds of fluid are employed for indicating the quantity of the liquid in a tank or similar receptacle, these indicating fluids being maintained in a closed system, that is, a system from which outside air is excluded so that evaporation of the indicating fluids is prevented, and staining of the reading device of the indicator due to the evaporation of such fluids is done away with so that the indicator dial, tube, or other device is kept clean, thereby rendering accurate readings.

It is a further object of the invention to produce such a closed system for indicating liquid quantities in which an expansion of the fluids in the system is taken care of, as for instance, where the system is used in automobiles, tractors, airplanes and the like, and where it is subjected to engine heat.

A further object of the invention is to provide a compact, simple and efficient indicating mechanism particularly adapted for automobiles and the like, whereby the amount of both gasoline and oil in the vehicle may be accurately kept track of.

A further object of the invention is to produce a mechanism for effecting these principal objects which shall be of few parts, therefore, cheap to construct, easily installed in new vehicles or in vehicles already in use, and in which there shall be slight wear of the parts, so that even after long service accurate readings may still be obtained.

It is a further object of the invention to provide such a mechanism which will have but a small indicating movement to effect the indicating function, and one which can be used in any tank or similar receptacle, being particularly adapted for deep and narrow tanks, such as the tanks of automobiles, airplanes, and the like.

With these and other objects, not specifically referred to, the invention consists in certain novel parts and combinations, which will be fully described in connection with the accompanying drawings which illustrate a preferred embodiment of the invention, and the novel features will then be pointed out in the claims annexed hereto.

In the drawings—

Figure 1 is a sectional side elevation of the improved indicating mechanism showing the indicating device for indicating both gasoline and oil, one of the tanks or reservoirs being shown.

Figure 2 is a sectional side elevation on an enlarged scale of the construction shown in Fig. 1, this figure also showing the connection to two tanks or receptacles for holding gasoline and oil.

Figure 3 is an end view, partly broken away and partly in section, taken on the line 3—3 of Fig. 1.

Figure 4 is a detail sectional view of one of the indicators taken on line 4—4 of Fig. 1.

Figure 5 is a detail front view of the reading part of the indicator.

Figure 6 is a sectional plan view on an enlarged scale of the float and its operating connections, the view being taken on line 6—6 of Fig. 1.

Figure 7 is a side elevation, partly in section, of an improved construction which may be employed under some circumstances; and Figure 8 is a diagrammatic side elevation showing the device as it may be arranged in an automobile for indicating both the quantity of gasoline and oil carried by the machine.

Referring now to these drawings and first to Fig. 8, the invention has been shown as embodied in an automobile and as used to indicate the amount of both gasoline and oil carried in the machine. It will be understood, however, that the invention has been designed for, and is capable of use in many other relations where there is a tank or similar receptacle for containing a fluid the quantity of which it is desired to be known, and that the invention is not to be limited to use with a moving vehicle, such as an automobile, airplane, boat, or the like.

While, furthermore, the invention is shown as indicating the amount of gasoline and oil, it will be understood that it could be used for either or both, or with tanks containing fluids other than these substances.

In the construction illustrated there is diagrammatically shown an automobile A having gasoline tank B which in the particular construction illustrated, is a pressure tank, and an oil sump or receptacle C from which oil is supplied to the motor in the usual manner. In the particular construction illustrated the invention has been shown as applied to a car already constructed. When the invention is thus employed preferably an additional tank D is provided which can be secured to the gasoline tank B of the car. It will be understood, however, that the device may, if desired, be installed in the main tank B, and in a new construction will preferably be so built in.

Where used as shown a by-pass E is employed connecting the tanks B and D so that the liquid level in each will be the same and, where as shown, the tank is a pressure tank, a by-pass F will connect the two tanks so as to equalize the pressure therein. From the tank D a pair of tubes or pipes 1, 2 are led to an indicator G conveniently arranged on the dash of the machine, though, of course, this indicator may be placed at any desired point.

The oil sump of the crank case C is preferably connected by a by-pass 3 to an auxiliary reservoir or tank 4 from which lead pipes or tubes 5, 6, to the dash indicator G, so that both the quantity of oil and gasoline in the car are indicated at a convenient place for the operator.

In accordance with the invention, the quantity of liquid in the tanks D and 4 are indicated on the dash by means of a liquid which moves to give readings as the tank levels rise or fall, and this indicating liquid is confined in a closed circuit, means being provided in the tanks for causing the movement of this liquid as the tank levels rise and fall. These indicating means will be the same for both the gasoline and the oil, as will likewise be the means for counteracting the expansion of the liquid due to heat, and a detail description of one will suffice for both. For convenience in reading the drawing, however, the reference characters employed for the oil side of the system will be primed in the drawings.

Referring now to Figs. 1 to 6, the construction employed for indicating the quantity of gasoline carried in the tank D will be described. As shown in the figures there is suitably secured to the interior of the tank a pair of spaced brackets 7, 8 connected by a frame 9. These brackets are formed with circular projections 11 and 12, to which are soldered or otherwise secured so as to be liquid tight one end of closed compressible chambers 13 and 14. The specific construction of these closed chambers may be somewhat varied, but preferably they are made of resilient metal such as thin copper which will compress and expand longitudinally, but which will resist sidewise pressure, the walls of the chambers being bent or corrugated, as indicated at 15 to form in effect a bellows which will contract and expand vertically.

The top of the chamber 13 and the bottom of chamber 14 are secured directly as by soldering to the brackets, and the bottom of chamber 13 and the top of chamber 14 are likewise secured as by soldering or in any other suitable manner so as to be liquid tight to heads 16 connected by a stem 17 so that as one chamber is compressed the other chamber is expanded and vice versa. The upper chamber 13 connects through pipe 1 with one side of the reading glass of the indicator, and the lower chamber 14 connects through pipe 2 with the other side or end of the glass, certain connections hereinafter referred to being interposed between the indicating glass and the chambers. One of these chambers, as chamber 13, is filled with a colored fluid, as for instance, a colored water solution, and the other chamber 14 is filled with a fluid of another color, and one which will not mix with the colored water, as for instance, an oil solution of a suitable density, one of these fluids, as the colored water, being indicated by the light shading 19, and the oil solution being indicated by the heavy shading 20. These solutions fill the system and are conducted to the opposite sides of the indicating device proper which is in the form of a glass tube 21, the oil solution being shown as above the water solution.

This tube may be supported in any suitable manner, as in upper and lower blocks 22, 23 secured in a casing 24 fixed to the dash or other suitable part of the machine, a reading plate 25 being secured to the front of the dash and having marked thereon gallon indications, as lines marked 26. As one or the other of the chambers 13, 14, is compressed or expanded the fluid therein is moved through the pipes and displaces the other fluid in the tube so as to cause a variation in the readings.

The expansion and contraction of the chambers are effected by suitable means operating by the rise and fall of liquid in the tank, as by a float 27 which may be of any suitable character, and which floats on the liquid contained in the tanks. In the particular construction illustrated this float is a metal hollow body, and is pivoted at each side at 28 to a pair of arms 29, which may be braced by cross braces 30. These arms at their other end are pivoted at 31 in the sides of frame 9, before referred to, so that they can rock in this frame and behind the pivot points are united by a cross arm 32. This cross arm is apertured to receive a threaded rod 33 and thrust nuts are provided on each side of the arm 32 by turning which the rod may be given a slight forward and back movement. The other end of this rod is formed in a yoke 35 (see Fig. 6) between the arms of which is secured by means of a pin and nut 37, the stem 17, before referred to, which connects the chambers 13 and 14. With this construction the stem 17 may be moved to the right or the left with respect to the float 27 and consequently the amount of movement given the stem by the float may be varied. The side of the tank may be provided with a hole 36 closed by a cap 36' through which a tool may be inserted to effect this adjustment when required. The flexible walls of the chambers 13 and 14 will give or flex sufficiently to permit this adjusting movement.

With this construction as the float 27 rises and falls with the level of the gasoline in the tank D it causes the bellows of chambers 13 and 14 to expand and contract which causes the enclosed mass of fluid with which the bellows and pipes are filled to move, which movement shows on the indicator tube 21 and gives an arcuate reading of the quantity of gasoline which is in the tank D. The movement of the bellows required to effect the easy and accurate reading may be adjustable through the connections described depending on the amount of movement it is desired to give the fluid in the reading tube, and but a small movement of the bellows is necessary to effect a movement at the indicator, which will give the desired reading.

The construction so far described may be used for giving accurate readings where the system is not exposed to heat. In the best constructions where the system is to be used in automobiles or in like situations of close proximity to a source of heat, means will be provided for allowing of the expansion and contraction of the fluids in the system so that such expansion and contraction will not affect the readings on the indicator. While this is effected to some extent by providing a construction in which fluids of substantially equal rates of expansion are opposed to each other in the glass, it may in some instances be desirable, particularly where the indicating gage is provided with very fine divisions, to almost completely counteract the effect of the expansion and contraction, and one means for effecting this is shown in the drawings.

Referring now to Figs. 1 and 2, there will be provided in the system what may be termed expansion chambers, these expansion chambers being located between the chambers 13 and 14, before referred to, and the reading tube and one of these chambers will be provided in each of the fluid connections. These expansion chambers may, of course, be placed at any suitable point in the fluid circuit, but in the particular construction shown they are located in the casing 24, before referred to, so as to provide a compact and convenient construction. Furthermore, these expansion chambers may form a convenient means for filling the system with the indicating fluids.

In the particular construction illustrated, the system, including the expansion chambers, where such means are employed for counteracting the expansion of the fluid, is filled with the fluids and each of the chambers will be formed with a part which will expand and contract so as to permit the fluid therein to expand or contract without affecting the level in the reading tube. In the particular construction illustrated, there are provided two of these chambers 39, 40. These chambers are formed in the block 41 secured in the casing 24, before referred to, and each of these chambers has a compressible portion in the form of a bellows 42, 43, soldered or otherwise secured so as to be liquid tight to the block, the other ends of the chambers being closed by heads 44 provided with projections 45 against which contact one end of springs 46, the other ends of the springs seating against collars 47 carried on screws 48 adjustably supported in a frame 49 supported from the block 41, before referred to, lock nuts 50 being provided for holding the screws in adjusted position, this construction providing for adjustment of the expansion chambers. Expansion chamber 39 connects through port 51 with pipe 1 leading from chamber 13, before referred to, and also through port 52 and pipe 53 connects with the reading tube 21 through port 54 formed in the lower block 23, before referred to, so that the colored water is admitted to the lower part of the tube.

Similarly expansion chamber 40 communicates through port 55 with pipe 2 leading from chamber 14, and through port 56, connection 57 and port 58 in the upper block 22 connects with the upper part of the tube 21, so that the solution of oil is admitted to the upper end of the tube.

The expansion chambers 39, 40 are closed with screw plugs 59 having head nuts 60, and the chambers, pipes, and the chambers 13 and 14 may thus be readily filled, the plugs being removed for this purpose and then screwed into place. The flexible bellows 42 and 43 of these chambers which can be adjusted as desired by adjusting screws 48, permit of the expansion in the system of the fluid before it reaches the reading tube so that such expansion due to the heat of the motor does not cause any change in the readings.

With the construction as described, therefore, a very accurate and delicate reading of the amount of liquid in the tanks may be provided, and the system being closed, evaporation is prevented and consequent staining of the reading tubes is prevented so that an accurate reading may always be obtained.

As before stated, a similar construction may be employed, particularly with automobiles, for indicating the amount of oil in the tank 4, and where such construction is employed it will preferably be arranged as shown in Fig. 2 with the reading tubes 21', therefore, arranged adjacent the tube 21, so that both readings may be readily made through the face plate 25, as shown in Fig. 5. The particular construction of the mechanism for indicating the oil is the same as that for the gasoline, and need not again be described, the parts, however, being primed for convenience in the reading of the drawings.

In constructions embodying the invention in its best form, means may be provided for levelling up the two liquids in the system after it has been filled so that if, for instance more water solution than oil solution is put in the system, it can be adjusted so that the oil and water will keep a median line, as the point $x$ in the tube. Whole various constructions may be employed for effecting this, there will be provided what may be termed relief or expansion chambers which are connected in the system. As shown the blocks 22, 23, before referred to, have each secured thereto bellows shaped chambers 61 which are longitudinally compressible, these chambers being secured at one of their ends to the blocks by soldering, or in any other suitable manner, so as to be liquid tight. These chambers connect by means of ports 62 with the ports 54 and 58, before referred to. The ends of the chambers opposite the blocks are formed in heads 63 and are connected by a screw 64, which takes through a thrust block 65 on a stationary arm 66 secured to the block. Taking against this thrust block are adjustable nuts 67 by which the screws may be raised or lowered, thus compressing one of the chambers and expanding the other. With this construction by adjusting the nuts 67, the level of the two liquids in the system, if one should happen to be put in in a quantity in excess of the other, can be brought to the median line $x$ and the readings consequently made accurate.

In Fig. 7 is illustrated a modified construction which may be employed under some circumstances if desired, particularly where a fine reading is not required and in which accurate counterbalance of the expansion due to heat is unnecessary. In this construction the tank, such as tank D is provided with one bellows shaped compressible chamber 70 secured at one end in a bracket 71 and supported at the other end on a stem 72. This stem is connected to a float arm 73 operated by a float 74 pivoted at 75 to a lower bracket 76 fastened to the wall of the tank. This chamber is connected through a pipe 77 to the under side of a glass reading tube 78 and the chamber 70 is filled with one kind of fluid, as colored water. The chamber 70 is or may be provided with a cap 79 through which the colored water may be poured into the chamber to fill the chamber and the pipe and the reading tube to the desired height. The other end of the reading tube connects through a pipe 80 with a bellows shaped compression chamber 81, suitably supported and provided with a filling cap 82, this chamber, pipe 80, and the upper half of the reading tube 78 being filled with a fluid of another color nonmiscible with the water solution, and having substantially the same rate of expansion. With this construction as the float rises or drops the chamber 70 is contracted or expanded and through the pressure of the fluid the chamber 81 is expanded or contracted and the quantity of liquid in the tank indicated on the reading tube. This construction while not entirely accurately taking care of expansion due to heat will, because of the arrangement and character of the compression, do so for all practical purposes unless an exceedingly fine and accurate reading is required.

While the invention has been shown and described in its preferred forms, it will be understood that changes and variations may be made in the details of construction, and the invention is not to be restricted to the exact construction illustrated and described, nor is it to be restricted to any particular character of liquid or to any particular use, but is capable of a wide range of uses other than in automobiles and other moving vehicles.

What I claim is:

1. In a mechanism for indicating the liquid contents of a tank or the like, the combination of a float rising and falling with the liquid in the tank, a pair of fluid-containing compressible and expansible chambers, connections between the float and said chambers for compressing one chamber and expanding the other as the float rises and vice versa as it falls, connections between the chambers into which fluid is transferred from one chamber as it is compressed and from which fluid is correspondingly transferred to the other chamber as the latter is expanded, and a member with which the fluids thus moved co-act to indicate the contents of the tank.

2. In a mechanism for indicating the liquid contents of a tank or the like, the combination of a float rising and falling with the liquid in the tank, a pair of fluid containing compressible and expansible chambers, connections between the float and said chambers for compressing one chamber and expanding the other as the float rises and vice versa as it falls, connections between the chambers into which fluid is transferred from one chamber as it is compressed and from which fluid is correspondingly transferred to the other chamber as the latter is expanded, a member with which the fluids thus moved co-act to indicate the contents of the tank, and an expansible chamber and means for controlling its expansion in the fluid line through which the fluids pass before they reach the indicator whereby the expansion or contraction of the fluids due to temperature changes may take place without causing variations at the indicator.

3. In a mechanism for indicating the liquid contents of a tank or the like, the combination of a float rising and falling with the liquid in the tank, a pair of fluid containing compressible and expansible chambers, connections between the float and said chambers for compressing one chamber and expanding the other as the float rises and vice versa as it falls, connections between the chambers into which fluid is transferred from one chamber as it is compressed and from which fluid is correspondingly transferred to the other chamber as the latter is expanded, a member with which the fluids thus moved co-act to indicate the contents of the tank, and means for varying the compressible and expansible movement in both chambers.

4. The combination with a tank, of a float rising and falling with the liquid in the tank, an indicator, a pair of flexible-walled compressible and expansible liquid containing chambers, liquid holding connections from the chambers respectively to the opposite sides of the indicator, different colored fluids in the connections which meet in the indicator respectively, and connections from the float for compressing and expanding one of the chambers.

5. The combination with a tank, of a float rising and falling with the liquid in the tank, an indicator, a pair of compressible and expansible fluid containing chambers, fluid holding connections from the chambers to the opposite sides of the indicator, different colored fluids in the connections which meet in the indicator, connections from the float for compressing and expanding one of the chambers, means including expansible chambers acting to compensate for expansion or contraction of fluid in the chambers or connections without causing variations at the indicator, and means for controlling the expanding movements of the expansible chambers.

6. In a mechanism for indicating the liquid contents of a tank, the combination with a float rising and falling with the liquid in the tank, a pair of liquid containing flexible-walled compressible and expansible chambers, connections between the float and said chambers for compressing one chamber and expanding the other as the float rises and vice versa as its falls, pipe connections between the chambers into which fluid is transferred from one chamber as it is compressed and from which fluid is correspondingly transferred to the other chamber as the latter is expanded, an indicator having a gauge, said pipe connections extending to opposite ends of the gauge, and different colored fluids in the connections and meeting in the gauge.

7. The combination of a tank, a float therein, an indicator gauge glass, fluid containing connections at each end of the glass, different colored fluids in the connections meeting in the glass, means including two flexible-walled compressible and expansible chambers which are operated by the rise and fall of the float in the tank for causing the liquids to advance or recede in the connections and in the glass, and means including expansible chambers in the connections acting to compensate for expansion or contraction of the fluids therein due to temperature changes without causing variations of the fluid level at the indicator.

8. The combination of a tank, a float therein, a pair of closed flexible-walled compressible fluid containing chambers, mechanical connections between the chambers operated by the float, an indicator, pipe connections from one chamber to one side of the indicator, pipe connections from the other chamber to the other side of the indicator, and means for adjusting the extent of the compressible movement of the chambers.

9. The combination of a tank, a float therein, a pair of closed compressible chambers containing different colored fluids, a stem connecting the chambers and connected with the float so that as one chamber is expanded the other is collapsed, an indicator, and pipe connections from the chambers to each side of the indicator.

10. The combination of a tank, a float therein having an arm, a pair of closed compressible and expansible fluid holding chambers, a stem connecting the chambers, means for effecting a relative adjustment between the stem and float arm, an indicator, and pipe connections from the chambers to opposite sides of the indicator.

11. The combination of a tank, a float therein, a pair of closed compressible chambers containing different colored fluids, connections between the chambers operated by the float, an indicator, pipe connections from the chambers to opposite sides of the indicator, closed compressible expansion chambers in the pipe connections, and means for adjusting the expansion chambers.

12. The combination of a tank, a float therein, a pair of closed compressible chambers containing different colored fluids, connections between the chambers operated by the float, an indicator, pipe connections from the chambers to opposite sides of the indicator, closed compressible expansion chambers in the pipe connections, and closed adjusting chambers for adjusting the fluid levels in the indicator.

In testimony whereof, I have hereunto set my hand.

CLARENCE A. DE GIERS.